（12） United States Patent
Colburn et al.

(10) Patent No.: US 6,173,404 B1
(45) Date of Patent: Jan. 9, 2001

(54) SOFTWARE OBJECT SECURITY MECHANISM

(75) Inventors: Alex Colburn, Renton; Steven M. Drucker, Bellevue; Kirk J. Marple, Redmond; Don P. Mitchell; Manny Vellon, both of Bellevue, all of WA (US)

(73) Assignee: Microsoft Corporation, Redmond, WA (US)

(*) Notice: Under 35 U.S.C. 154(b), the term of this patent shall be extended for 0 days.

(21) Appl. No.: 09/028,546

(22) Filed: Feb. 24, 1998

(51) Int. Cl.[7] .............................. H04L 9/32; G06F 17/30
(52) U.S. Cl. ...................... 713/200; 707/103; 709/315
(58) Field of Search ................................. 713/200, 201, 713/202; 707/9, 103; 380/3, 4, 23; 709/104, 206, 315, 229

(56) References Cited

U.S. PATENT DOCUMENTS

| | | | |
|---|---|---|---|
| 5,280,614 | * | 1/1994 | Munroe et al. ................. 709/107 |
| 5,720,033 | * | 2/1998 | Deo .................................. 7132/200 |
| 5,757,914 | * | 5/1998 | McManis ......................... 713/200 |
| 5,787,427 | * | 7/1998 | Benantar et al. .................. 707/9 |
| 5,826,266 | * | 10/1988 | Honda .................................. 707/9 |
| 5,850,346 | * | 12/1998 | Barrus ......................... 364/748.01 |
| 5,878,415 | * | 3/1999 | Olds .................................... 707/9 |
| 5,970,145 | * | 10/1999 | McManis .......................... 380/23 |
| 5,995,973 | * | 11/1999 | Daudenarde et al. ............. 707/103 |
| 5,999,978 | * | 12/1999 | Angal et al. ...................... 709/229 |

FOREIGN PATENT DOCUMENTS

| | | | | |
|---|---|---|---|---|
| 472487A2 | * | 2/1992 | (EP) | ............................. G06F/9/46 |
| 04239354 | * | 8/1992 | (JP) | ........................... G06F/12/14 |

* cited by examiner

Primary Examiner—Robert W. Beausoliel, Jr.
Assistant Examiner—Christopher Revak
(74) Attorney, Agent, or Firm—Ipsolon LLP

(57) ABSTRACT

A software object security mechanism addresses system security risks that arise due to interactions between software objects. Conditions are imposed on the accessing of targets by accessing object instances according to attributes of the accessing object and the target object that is being accessed. One security feature is that an owner identifier is incorporated into objects. The owner identifier includes identification of the user, person, or entity (e.g., corporation) who or that creates the object, or identification of a computer system used by the user, person, or entity to create the object definition. The owner identifier provides a basis for distinguishing the creator of an object from the user of that object. Another security feature is a set of access authorizations that allow different access rights to be made available to different object creators. In one implementation the access authorizations are All, Owner, and Exemplar. Another security feature is that exemplar identifiers are encoded into properties and methods in which the properties and methods are defined. Since exemplars may be authored by anyone and may be changed at run time, these security features insure that inheritance from exemplars of questionable lineage is safe. These security features prevent an exemplar in the hierarchy for an object or object instance from damaging the instance data.

30 Claims, 10 Drawing Sheets

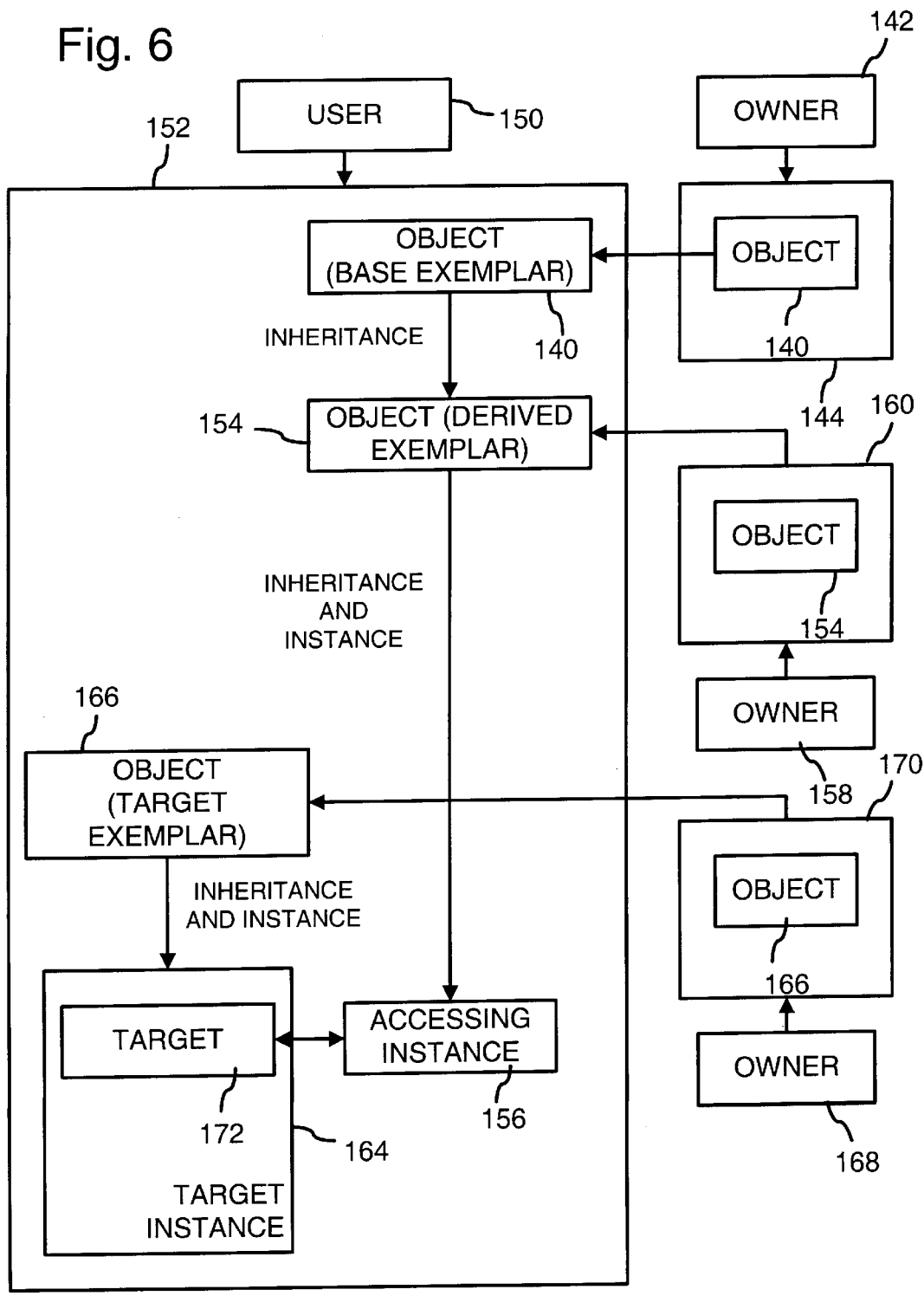

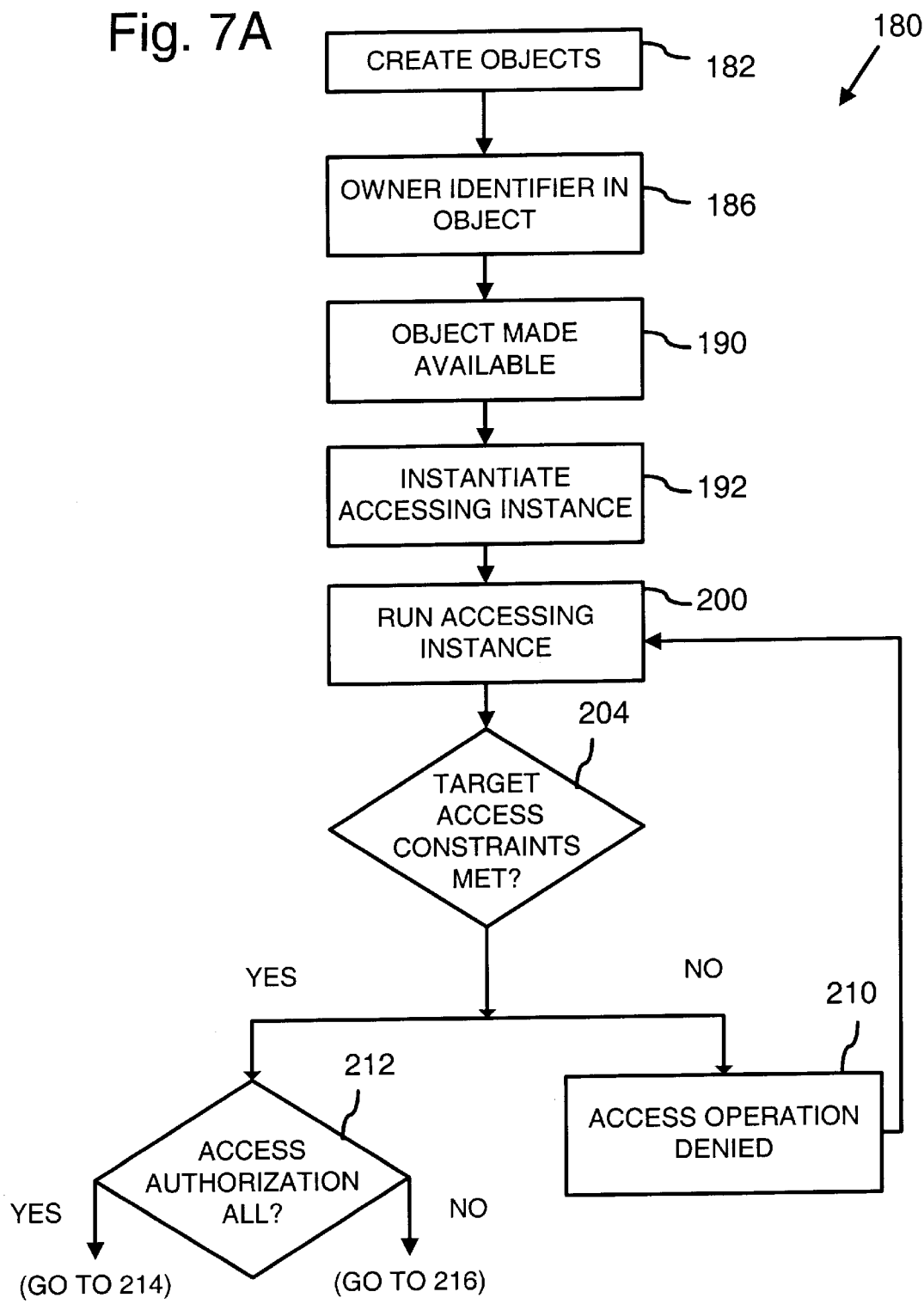

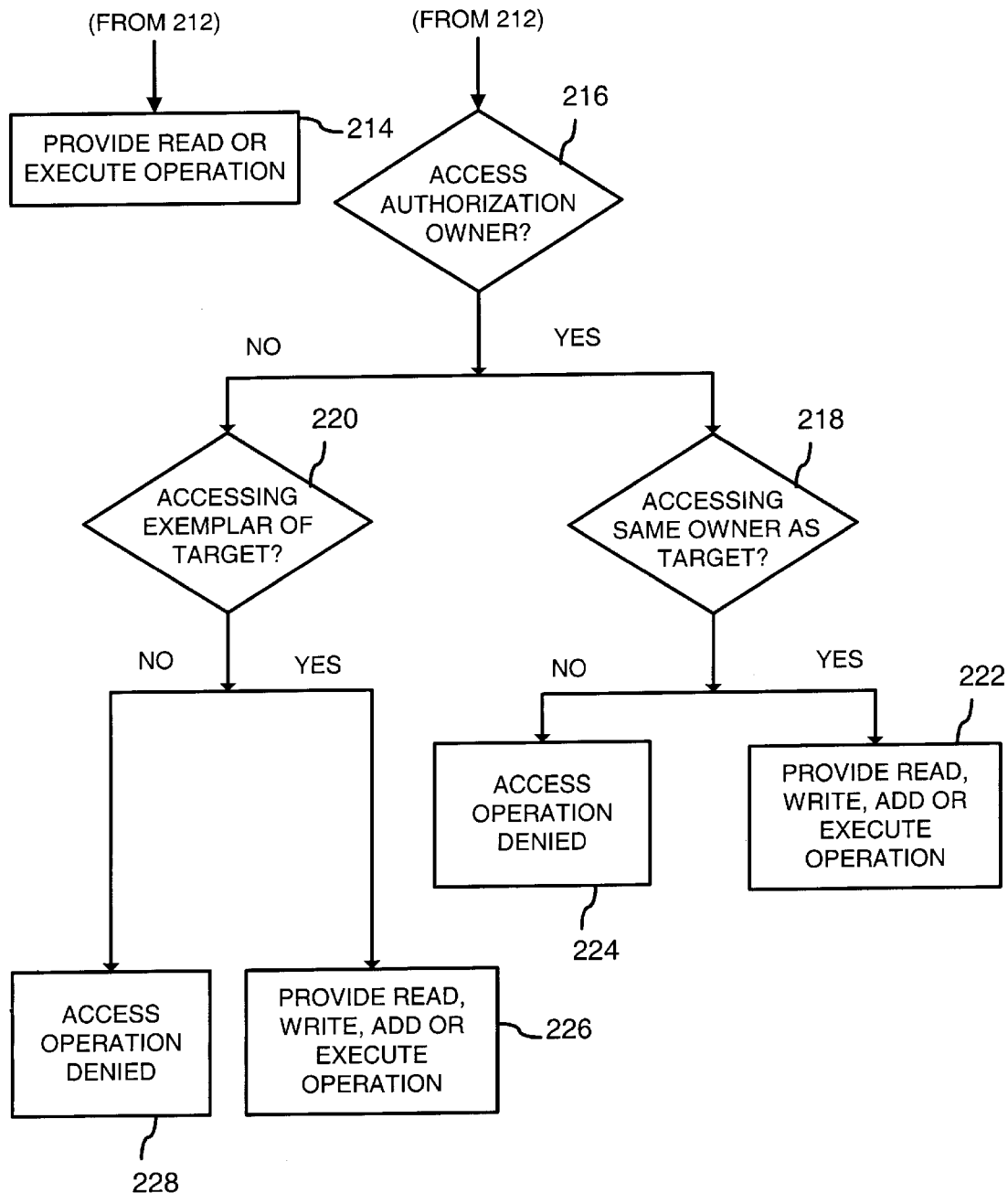

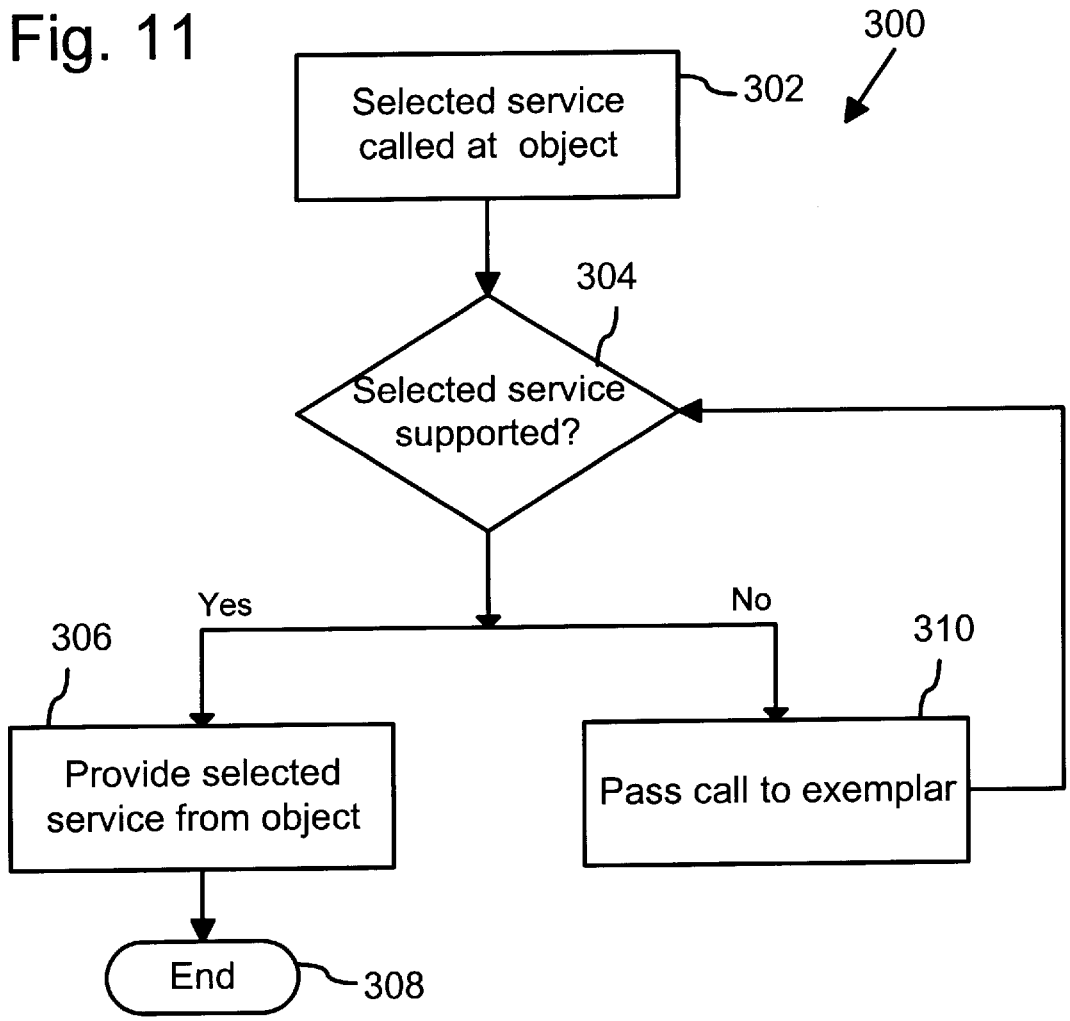

SOFTWARE OBJECT SECURITY MECHANISM

FIELD OF THE INVENTION

The present invention relates to secure interactions between software objects and, in particular, to a security process or mechanism that bases access to objects upon the commonality of the sources of the objects.

BACKGROUND AND SUMMARY OF THE INVENTION

A conventional interfaced software object provides software services, such as methods or properties, which are accessed by one or more interfaces. A method is typically a function or procedure that performs a specific action and is called via a corresponding interface. A property is typically information or data and is also called via a corresponding interface. Objects are commonly implemented in a server that, for example, may be a dynamic link library utilized by a software program or may be an entirely separate executable process.

The creation of and interaction between software objects can pose security risks to a user's computer system. In general, the security risks arise because the object definitions from which objects are created or instantiated sometimes are created by other users who are unknown and potentially untrusted. Some objects can cause damage to or improperly disclose information on a user's computer system. This damage or disclosure of information could arise as a result of either an unintentional error in the corresponding object definition or an intentional or malicious "Trojan horse," virus or other program.

More specifically, the risk arises because an object would conventionally be run on computer system with the full rights and permissions of its user. The danger is that running an instance of the object created by one user, who is potentially unknown and untrusted, with the permissions of another user on his or her computer system could allow the object to cause damage to or improperly disclose information from the computer system. Typically such an object would seek to access properties or methods of another object (i.e., a target object) on the user's computer system. The damage or disclosure of information could arise as a result of the accessing object being permitted free access to all the properties and methods on the target object. Such access could be in the form of read, write, execute or add operations that are performed by the accessing object on a service of the target object.

According to the present invention, a security mechanism addresses such system security risks by imposing conditions on the accessing of targets by accessing object instances according to attributes of the accessing object and the target object. One security feature is that an owner identifier incorporated into objects. The owner identifier includes identification of the user, person, or entity (e.g., corporation) who or that creates the object, or identification of a computer system used by the user, person, or entity to create the object definition. The owner identifier provides a basis for distinguishing the creator of an object from the user of that object. This distinction allows instances of objects created by others to be given fewer access permissions or rights than the user implementing the object.

Another security feature is a set of access authorizations that allow different access rights to be made available to different object creators. In one implementation the access authorizations are All, Owner, and Exemplar. Object services or targets with the access authorization All indicate that all objects, regardless of their Owner, may perform access operations on the targets. However, the operations that can be performed with this access authorization could be limited to read and execute operations. Targets with the access authorization Owner indicate that only the owner of the target instance may access it. Object services with the access authorization Exemplar relate to an implementation utilizing hierarchical relationships between objects, as described below. This access authorization indicates that only services defined on the same exemplar as the target instance may access those targets. In this implementation, the Exemplar access authorization is the most restrictive and the All access authorization is the least restrictive.

These security features provide various security levels by which objects from trusted and secure sources can have extensive access to a user's computer system resources while objects from unknown or untrusted sources have only limited, relatively safe access rights. Such versatility allows a user to utilize safely objects from a wide variety of sources. This may be referred to as inter-object security.

Moreover, these security features are applicable to objects operating within a single computer system or in a client-server context in which objects and object components are transmitted between a client computer and a separate server computer. Another security feature applicable to such a context is the treatment of unverified client communications to the server as being from an unknown or untrusted source.

The Exemplar access authorization relates to an implementation utilizing objects having hierarchical relationships and inheritance characteristics. Conventional objects include the characteristic of interface inheritance in which the definitions of the methods that an interface supports may be inherited by another interface. The interfaces may be of different objects that may or may not be of the same class of objects. An object supporting an inherited interface can be treated like the object from which the interface is inherited. Such objects may be implemented by or in accordance with many object-oriented programming tools or models including, for example, the component object model (COM).

An interface of an object may not be changed once the design and implementation of the interface is complete and the object is established, distributed, or promulgated for general run-time use. Adding new services to or modifying existing services in such an object requires that a new interface be defined in a design-time operation. The new interface would then be distributed or promulgated for general run-time use. The new interface may inherit services from an existing interface, but the new interface remains distinct and has a unique identifier. Despite interface inheritance, therefore, interfaces remain static once they have been established, distributed, or promulgated for use at run-time.

While providing stability and predictability in the use of objects, the static nature of object services at run-time limits the flexibility of objects. In some applications the lack of flexibility in object definitions can pose an undesirable limitation. An example of such an application is an interactive virtual world environment that represents a real or imaginary place using graphic and audio data for presenting the place to a computer user and allowing the user to interact with it.

Objects with conventional static interfaces can be used to provide users of a virtual world environment with a predefined environment with which the user can interact. A disadvantage with objects having conventional static interfaces in such an environment is that changes to the environment cannot be made at run-time. Changes must be made by adding interfaces in a design-time operation. This restricts the level of interaction or control that users can have with or over the environment.

In one implementation of this invention, object services like methods or properties are provided to or inherited by objects dynamically during run-time. This dynamic inheritance may be provided within the context of an object model, such as the Component Object Model, that supports only design-time interface inheritance. As applied in a virtual world environment, for example, dynamic inheritance can provide users with increased levels of interaction or control.

In a method of providing dynamic inheritance, hierarchical relationships are defined between multiple objects such that each object references or is referenced by another object. One of the objects is a root object, or exemplar, that is referenced by at least one other object but that does not reference another object. A call is made for a particular service (e.g., a method or property) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced whenever the service is available therefrom or the call is passed to yet another referenced object until the service can be provided. The call may be passed to multiple successive referenced objects until the call reaches the root object, which either provides the service or the service is deemed unavailable.

While inter-object security protects an object from other objects, these security features further provide intra-object security by also protecting an object from itself and its exemplars. Another security feature is that exemplar identifiers are also encoded into properties and methods in which the properties and methods are defined. Since exemplars may be authored by anyone and may be changed at run time, these security features insure that inheritance from exemplars of questionable lineage is safe. These security features prevent an exemplar in the hierarchy for an object or object instance from damaging the instance data. Conversely, an instance cannot access exemplar only properties.

Additional objects and advantages of the present invention will be apparent from the detailed description of the preferred embodiment thereof, which proceeds with reference to the accompanying drawings.

BRIEF DESCRIPTION OF THE DRAWINGS

FIG. 6 is a block diagram illustrating creation and use of an object definition that utilizes hierarchical inheritance relationships such as those illustrated in FIGS. 3 and 4.

FIGS. 7A and 7B is a flow diagram of one embodiment of a process for creating and instantiating objects with a security mechanism or process for protecting against computer system security breaches.

FIG. 11 is a flow diagram illustrating a hierarchical inheritance process.

DETAILED DESCRIPTION OF PREFERRED EMBODIMENT

Figure 1:
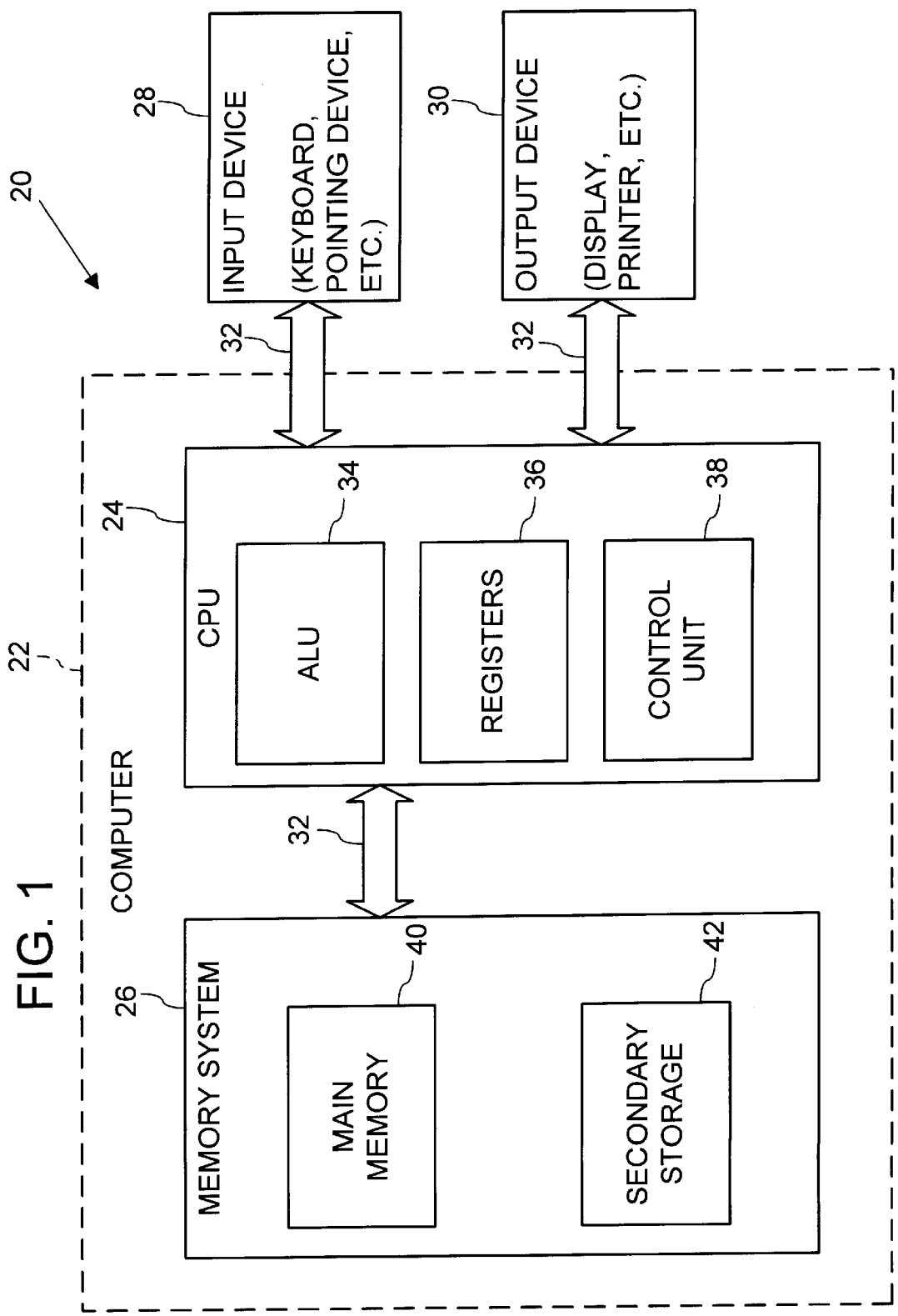
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
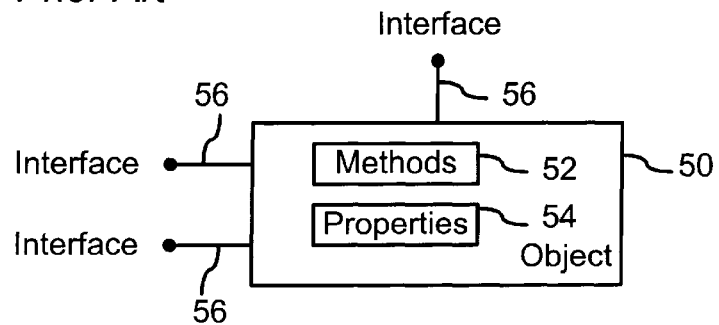
FIG. 2 is a block diagram of a prior art interfaced software object.

FIG. 2 is a block diagram of an exemplary prior art interfaced software object 50 that provides software services such as methods 52 or properties 54 that are accessed by one or more interfaces 56 (multiple shown). A method 52 is typically a function or procedure that performs a specific action and is called via a corresponding interface 56. Properties 54 (also referred to as states or attributes) typically are information or data and are called via a corresponding interface 56. Object 50 is implemented in a server that, for example, may be a dynamic link library utilized by software program or may be an entirely separate executable process.

Each object 50 is an instance of a specific class of related objects. Exemplary object 50 also includes the characteristics of encapsulation, polymorphism, and inheritance. Object 50 encapsulates its properties 54 so each property 54 is accessed only through one of methods 52, thereby protecting the properties (or data) from inappropriate access and errors that can arise therefrom. Object 50 supports polymorphism in that object 50 may present to a software client an interface or a method definition that appears to the client to be the same as an interface or a method definition of another object in a different class. Such interfaces or method definitions of different objects may appear the same to the client of even if the resulting methods have different implementations.

And object 50 also includes interface inheritance in which the definitions of the methods that object 50 supports may be inherited by another object. Interface inheritance simplifies implementation of polymorphism because an object supporting an inherited interface can be treated like the object from which the interface is inherited. Object 50 may be implemented by or in accordance with many object-oriented programming tools or models including, for example, the component object model (COM). COM is a foundation for object oriented technologies such as OLE and ActiveX utilized by Microsoft Corporation and others. By way of example, the following description is made with reference to an object 50 implemented according to COM, but is similarly applicable to other object-oriented programming tools or models of similar characteristics.

Interfaces 56 of object 50 may not be changed once object 50 is established, distributed, or promulgated for general use at run-time. Adding new services to or modifying existing services in such an object 50 requires that a new interface be defined. The new interface may inherit services from an existing interface, but the new interface remains distinct and has a unique identifier. As a result, interfaces 56 are static. While being a limit on the extensibility of objects, static interfaces provide stability and predictability in the use of objects.

Figure 3:
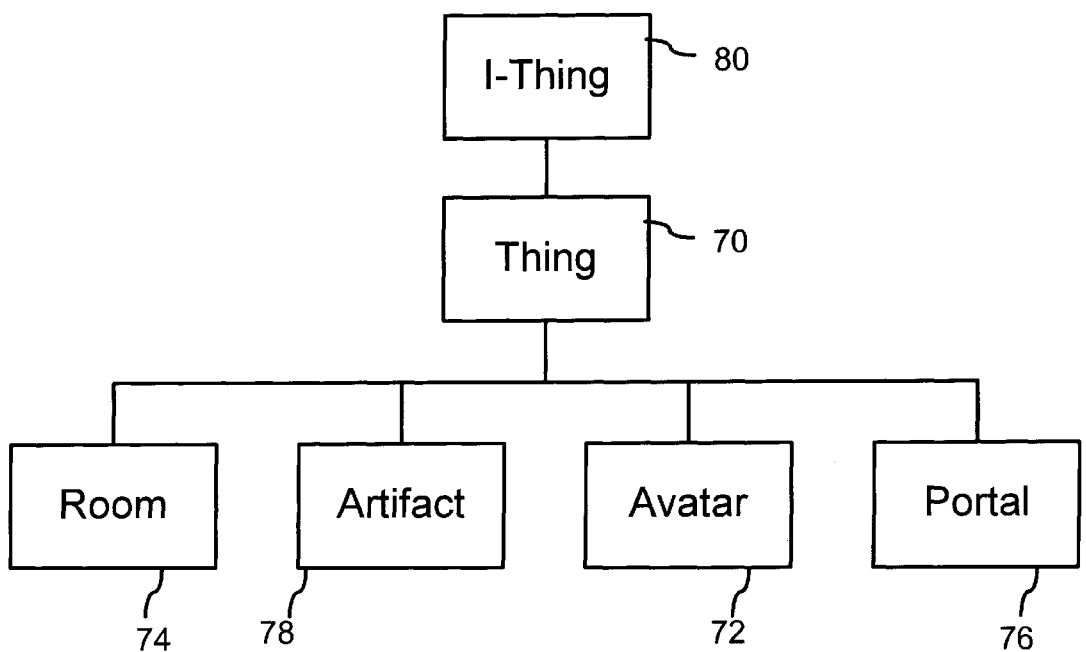
FIG. 3 is a block diagram representing hierarchical inheritance relationships between an exemplary set of objects.

FIG. 3 is a block diagram illustrating hierarchical inheritance relationships between an exemplary set of objects 70–78 according to the present invention. For purposes of illustration, objects 70–78 will be discussed with reference to a representation of a virtual world environment or domain. The virtual world environment represents a real or imaginary place using graphic and audio data that are presented to a computer user. Objects 70–78 are of an interactive virtual world environment object (not shown) and correspond to particular types of entities or articles within the environment. It will be appreciated, however, that this illustration does not limit the applicability of dynamic inheritance between objects to a virtual world environment and that dynamic inheritance of this invention can be used with objects in other applications, representations, models, or schemes.

Objects 70–78 are the basic objects from which other objects inherit services and are called the exemplars for the virtual world environment or representation. Objects 70–78 are based upon an interface 80 (designated I-Thing) that in one implementation is a COM object interface. It will be appreciated, however, that I-Thing interface 80 could alternatively be implemented according to other object models.

Object 70 (designated Thing) is the root or core of the set of all objects in the representation. Object 72 (designated Avatar) represents an avatar corresponding to a real person (e.g., the user) or a virtual person in the world. Object 74 (designated Room) and object 76 (designated Portal) represent and define the topology of the world as locations (i.e. rooms) and passageways (i.e., portals) between the rooms. Object 78 (designated Artifact) represents articles that are or may be manipulated by any of users via their avatars.

Figure 4:
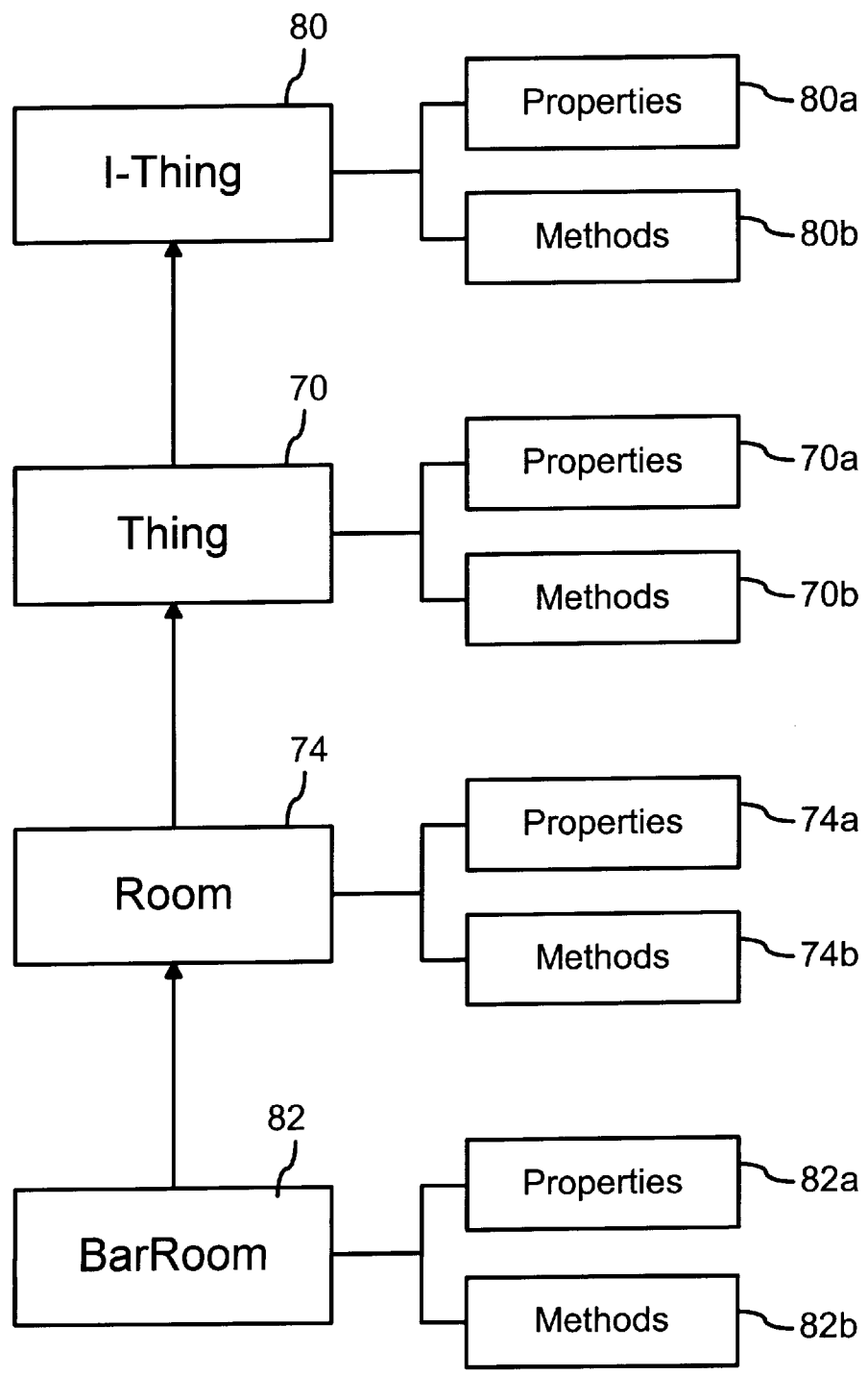
FIG. 4 is a block diagram illustrating a sequence of hierarchical inheritance relationships.

FIG. 4 is block diagram illustrating a sequence of hierarchical inheritance relationships between I-Thing interface 80, Thing object 70, exemplar Room object 74, and one example of a particular room object 82 designated BarRoom. Objects 70, 74, and 82 include the characteristics described with reference to objects 56 of object 50 which characteristics are represented as properties 70*a*, 74*a*, and 82*a* and methods 70*b*, 74*b*, and 82*b*, respectively. Thing object 70 is the root or parent exemplar of the set of objects and is the direct exemplar to Room object 72. Room object 72 is the direct exemplar to BarRoom object 82, which represents a particular room in the virtual world environment.

I-Thing interface 80 defines properties 80*a* and methods 80*b*, as described below in greater detail, that are available to all objects 70–78 and 82. Thing object 70 defines properties 70*a* and methods 70*b* shared by all other objects in the representation or virtual world environment, including exemplars 72–80 and particular object 82. Properties 70*a* include for a particular object an exemplar property that refers to the exemplar or parent of the particular object, a name property that lists the name of the particular object, and a description property that includes a text description of the particular object.

Properties 70*a* also include a geometry property that associates a geometric model for representing the object, a location property that defines a location object in the virtual world environment with or in which the particular object is positioned, a contents property that lists objects "contained" by the particular object, and an owner property that identifies a user that the "owns" the particular object.

As utilized in the exemplary virtual world environment, methods 70*b* include a MoveTo method for changing the room the particular object is in and a Tell method by which one object passes information to another. It will be appreciated, however, that other methods particular to a virtual world environment could be included in methods 70*b* and that different applications could use entirely different methods.

Room object 74 defines additional properties 74*a* and methods 74*b* shared by lower level objects in the virtual world environment, including object 82. Properties 74*a* include for a particular object an exit property indicating an exit from the room and an entrance property indicating an entrance into the room. Methods 74*b* include an announce method for broadcasting information to others in the room. BarRoom object 82 defines properties 82*a* and methods 82*b*, including a bartender property designating an avatar for hosting the room, a recipes property designating refreshments available in the room, an orderdrink method by which a user requests a refreshment from the bartender, and a requestmusic method by which a user requests a music selection.

Figure 5:
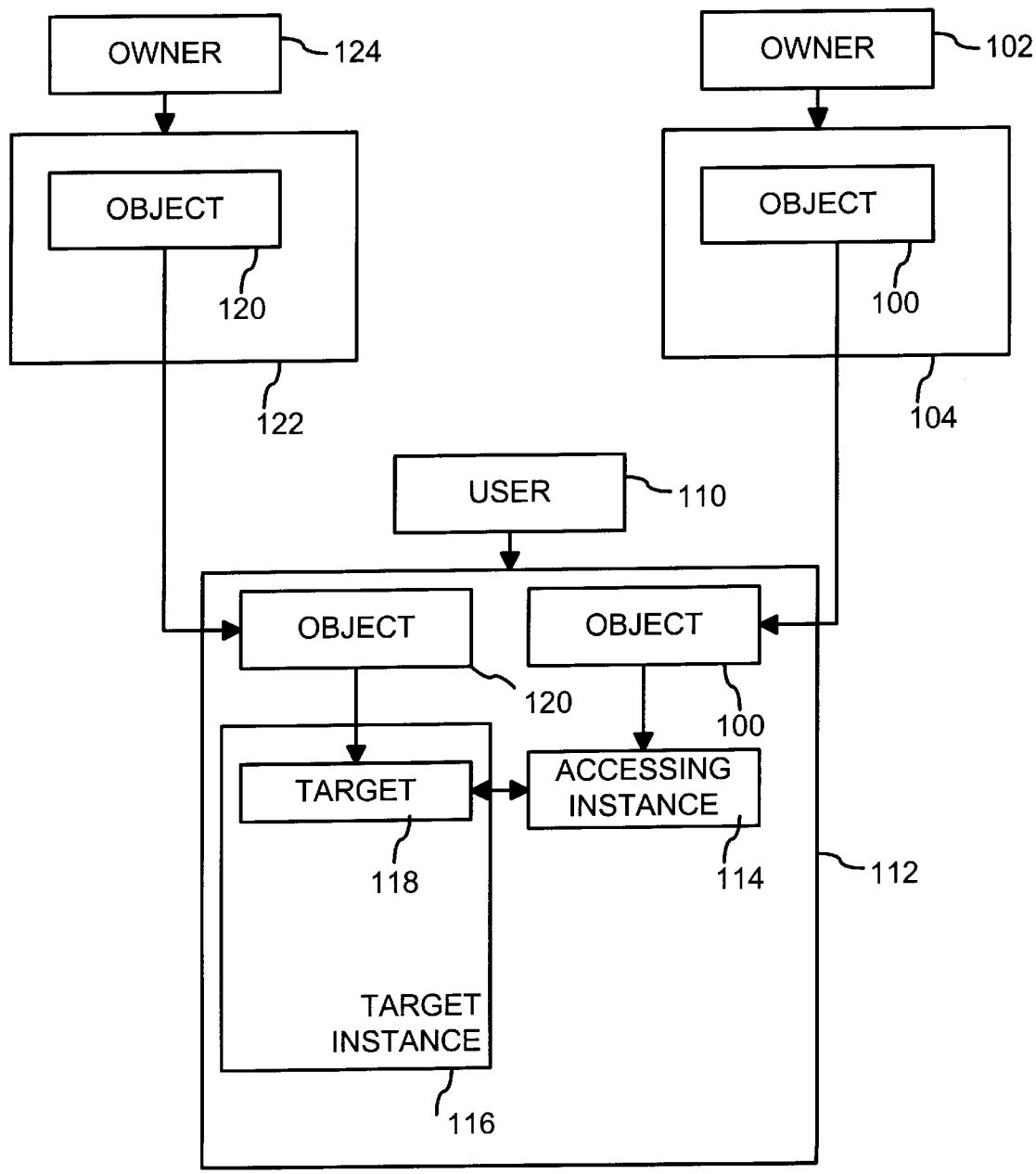
FIG. 5 is a block diagram illustrating creation and use of a software object.

FIGS. 5 and 6 illustrate exemplary ways in which creation of and interaction between software objects can pose security risks to a user's computer system. In general, the security risks arise because the object definitions from which objects are created or instantiated sometimes are created by other users who are unknown and potentially untrusted. Some objects can cause damage to or improperly disclose information on a user's computer system. This damage or disclosure of information could arise as a result of either an unintentional error in the corresponding object definition or an intentional or malicious "Trojan horse," virus or other program.

FIG. 5 is a block diagram illustrating creation and use of a software object. An object definition or object 100 is created by a user who is referred to as owner 102. Creation of object 100 includes, for example, defining the methods or properties or both that are associated with and provided by the object. Owner 102 is identified as a person or a computer system used by the person to create object 100, but in this illustration owner 102 is distinguished from a computer system 104 that is associated with owner 102.

Object 100 is passed or transmitted to another user 110 on another computer system 112. Object 100 may be passed to user 110 directly from owner 102 or indirectly via one or more other users, computers, or software distributors, in any manner that software components can be distributed, including electronic transmission or on a data storage medium. User 110 creates an object instance 114 that is based upon or instantiated from object 100. Instance 114 interacts with another object instance 116 within computer system 112 by accessing one or more methods or properties, referred to as a target 118, available on instance 116. Instance 116 is like instance 114 in that the former is based upon or instantiated from an object definition or object 120 that is developed on a computer system 122 by another user or owner 124. For reference purposes, instance 114 is referred to as an accessing instance 114 and instance 116 is referred to as target instance 116.

FIG. 6 is a block diagram illustrating creation and use of an object definition that utilizes hierarchical inheritance relationships such as those illustrated in FIGS. 3 and 4. An object definition or object 140 is created by a user, referred to as owner 142, on a computer system 144. Creation of object 140 by owner 142 is analogous to the creation of objects 100 and 120 and includes, for example, defining the methods or properties or both that are associated with and provided by the object. Owner 142 is identified as a person or a computer system used by the person to create object 140. In this illustration, owner 142 is distinguished from computer system 144. Object 140 is passed or transmitted to another user 150 on another computer system 152. Object 140 may be passed to user 150, either directly from owner 142 or indirectly via one or more other users or software distributors, in any manner that software components can be distributed including electronic transmission or on a data storage medium.

Object 140 on computer system 152 functions as an exemplar from which another object 154 inherits a method or property, and an object instance 156 inherits a method of property from object 154. Object 154 is created by a user, referred to as owner 158, on a computer system 160. Objects 140 and 154 and instance 156 utilize hierarchical inheritance relationships such as those illustrated in FIGS. 3 and 4, so object 140 is also referred to as exemplar base 140 and object 154 is also referred to as derived exemplar 154. These hierarchical inheritance relationships allow instance 156 to dynamically inherit object services from objects 140 and 154.

In addition, instance 156 interacts with and accesses an object service (e.g., a method or property), referred to as a target 162, from a target instance 164 within computer system 152. Target instance 162 is created or instantiated from a corresponding object definition or object 166 having substantially similar characteristics as objects 140 and 154. Object 166 that is created by a user, referred to as owner 168, on a computer system 170. As a result of it accessing operation, instance 156 is referred to as accessing instance 156. It will be appreciated, however, that while in this illustration instances 156 and 164 are accessing and target instances, respectively, in other contexts instances 156 and 164 could be the respective target and accessing instances.

In a conventional system, a method or property of an instance of an object is run or accessed according to the rights or permissions of the user who instantiated the object. In the illustrations of FIGS. 5 and 6, for example, instances 114 and 156 would be run on computer systems 112 and 152 according to the rights and permissions of users 110 and user 150, respectively. Permissions or rights establish the ability of a particular user to access a particular resource on a computer system. A user assigned to a particular computer system (e.g., a desktop personal computer) commonly has greater permissions than other users, whether they are known or unknown.

Instance 114 on computer system 112 poses a security risk. The risk arises because object 100 is created by user 102, who is potentially unknown and untrusted, but instance 114 would be run on computer system 112 in a conventional manner with the full rights and permissions of its user 110. In a system utilizing hierarchical inheritance relationships as illustrated in FIG. 6, instance 156 on computer system 152 poses similar security risks. The risks arise because objects 140 and 154 are created by users or owners 142 and 158 who are potentially unknown and untrusted. The danger is that running instances 114 and 156 with the permissions of users 110 and 150 can cause damage to or improperly disclose information in target instances 116 and 164, respectively. This damage or disclosure of information could arise as a result of either an unintentional error in the corresponding objects 120, 140 or 154 or an intentional or malicious "Trojan horse," virus or other program.

A security mechanism addresses such system security risks by imposing conditions on the accessing of targets by accessing instances according to attributes in the stack of calls or procedures, or call stack, representing interactions between object instances. Table 1 lists attributes obtained from the call stack to determine whether particular conditions are met to permit an accessing instance to access a particular target.

TABLE 1

| Attribute Name | Description |
| --- | --- |
| Target | The method or property being accessed |
| Accessing Instance | The object instance accessing the Target |
| Method | The method currently being invoked on the call stack |
| Operation | The type of access on the target, i.e., read, write, add, or execute |
| Access Constraints | The type of Operation allowed on the Target, e.g., only methods can have execute and only collection properties can have add |
| Access Authorization | The security class of object that is allowed to perform an Operation, e.g., All, Owner, and Exemplar |
| Target Instance | The instance from which the Target is accessed |
| Target Exemplar | The exemplar where the Target is defined |
| Method Exemplar | The exemplar where the Method was defined |
| Owner | The creator of an object |

An accessing instance is permitted to access a particular target if (1) the Access Constraints of the Target allow the Operation and any of the following conditions is met:

(a) The Access Authorization is All ("unrestricted condition"), then allow read or execute Operations (b) The Access Authorization is Owner and the Owner of the Method Exemplar is the same as the Owner of the Target Instance, then allow read, write, execute, or add Operations (c) The Access Authorization is Owner and the Accessing Instance is the Target Instance and the Operation is execute, then allow execute operations (d) The Access Authorization is Owner and the Accessing Instance and the Target Instance are in the same hierarchy and the Operation is add, then allow add operations (e) The Access Authorization is Exemplar and the Method Exemplar is the Target Exemplar and the Accessing Instance is the Target Instance, then allow read, write, execute, or add Operations Table 2 summarizes these conditions and the corresponding operations ((R)ead, (W)rite, (E)xcute, (A)dd) that are allowed. Table 2 also shows that satisfaction or more restrictive Access Authorizations (e.g., Owner and Exemplar) allows operations permitted explicitly by less restrictive Access Authorizations. For example, satisfaction of Owner and Exemplar Access Authorizations allows the read and execute operations explicitly permittied by condition (a).

TABLE 2

| Access Authorization | (a) | (b) | (c) | (d) | (e) |
| --- | --- | --- | --- | --- | --- |
| All | R,E | — | — | — | — |
| Owner | R,E | R,W,E,A | E | A | — |
| Exemplar | R,E | R,W,E,A | E | A | R,W,E,A |

These conditions may be summarized as follows:

(a) Allows unrestricted access to read and execute operations (b) Allows owners to access properties of objects they own, except in the case of Exemplar access authorizations (c) Allows an instance's method defined by one exemplar to execute methods defined by other exemplars in the instance's hierarchy (d) Allows an instance's method defined by one exemplar to add to collection properties defined on other exemplars in the instance's hierarchy (e) Allows exemplar methods to access properties defined by that exemplar on an instance These security features provide various security levels by which objects from trusted and secure sources can have extensive access to a user's computer system resources or objects while objects from unknown or untrusted sources have only limited, relatively safe access rights. Such versatility allows a user to utilize safely objects from a wide variety of sources. This may be referred to as inter-object security.

While inter-object security protects an object from other objects, these security features further provide intra-object security by also protecting an object from itself and its exemplars. Another security feature is that exemplar identifiers are also encoded into properties and methods in which the properties and methods are defined. Since exemplars may be authored by anyone and may be changed at run time, these security features insure that inheritance from exemplars of questionable lineage is safe. These security features prevent an exemplar in the hierarchy for an object or object instance from damaging the instance data. Conversely, an instance cannot access exemplar only properties.

FIG. 7A is a flow diagram of one embodiment of a process 180 for creating and instantiating objects with a security mechanism or process for protecting against computer system security breaches. The security mechanism included in process 180 is applicable to a variety of object models including the component object model (COM) and related technologies such as OLE and ActiveX. Process 180 is described with reference to a system utilizing hierarchical inheritance relationships, as illustrated in FIG. 6, but is similarly applicable to conventional object systems as illustrated in FIG. 5.

Process block 182 indicates that one or more object definitions or objects are created (e.g., objects 140 or 158). Each object forms the basis of an object instance (e.g., instances 156 and 164). An accessing instance (e.g., accessing instance 156) interacts with or accesses a method or property (e.g., target 172) at another instance (e.g., target instance 164) within a selected user's computer system.

The access might include Read, Write, Add, or Execute operations, but not all access operations are available from all object services (i.e., methods or properties). For example, only methods provide Execute operations and only collection properties, which represent groupings or collections of data or properties, allow Add operations. These and other limitations on access operations available from object services are represented by target access constraints.

Figure 8:
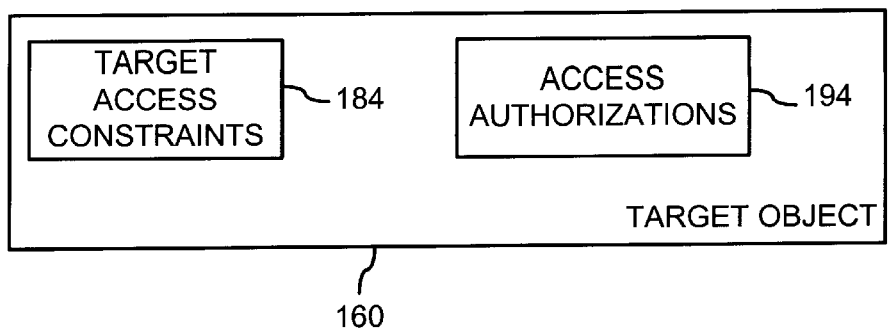
FIG. 8 is a block diagram illustrating target constraints associated with a target object.

FIG. 8 is a block diagram illustrating target constraints 184 associated with target object 160.

Figure 9:
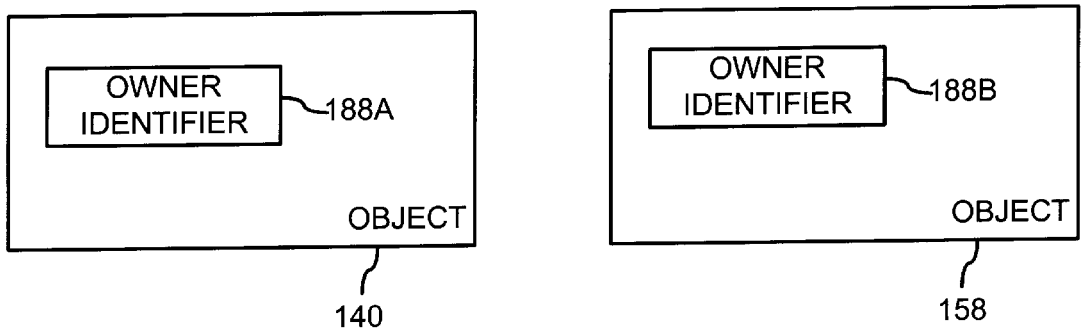
FIG. 9 is a block diagram illustrating owner identifiers incorporated into objects.

Process block 186 indicates that an owner identifier is incorporated into the object. FIG. 9 is a block diagram illustrating owner identifiers 188A and 188B incorporated into respective objects 140 and 158. It will be appreciated that the object from which target instance 160 is instantiated also includes an owner identifier.

Exemplary owner identifiers include identification of the user, person, or entity (e.g., corporation) who or that creates the object definition, or identification of a computer system used by the user, person, or entity to create the object definition. The object identifier may be in the form, for example, of a pointer to the owner IThing COM object. For purposes of illustration, process 180 is described as if the Owner identifier references the individual user who creates the object definition. It will be appreciated, however, that the Owner identifier could alternatively identify an entity (e.g., corporation or educational institution) where or a computer system on which the object definition is created.

Process block 190 indicates that the object is made available for use, either by the user who created the object or one or more other users.

Process block 192 indicates that a selected user instantiates on the selected user's computer system an accessing instance of an object (e.g., accessing instance 156) based upon the object (e.g., object 154).

The accessing object will seek access to a target (e.g., a method or property) of a target instance (e.g., target instance 164) on the selected user's computer system.

The selected user has a set of permissions or rights with regard to the computer system that allow the user to access a wider range of computer system resources than can be accessed by other users, particularly users who are unknown to the system. In addition, different classes of target object services have different access authorizations (e.g., access authorizations 194, FIG. 8) that represent different permissions or rights for performing different access operations. The target access authorizations indicate which objects are allowed access to particular services on a target object.

In one implementation, three levels of access authorizations 194 are All, Owner, and Exemplar. Object services or targets with the access authorization All indicate that all objects, regardless or their Owner, may perform access operations on the targets. Targets with the access authorization Owner indicate that only the owner of the target instance may access it. Object services with the access authorization Exemplar indicate that only services defined on the same exemplar as the target instance may access those targets. In this implementation, the Exemplar access authorization is the most restrictive and the All access authorization is the least restrictive. It will be appreciated, however, that other access authorization levels could be utilized, relating to a variety of considerations.

Process block 200 indicates that the accessing instance is run on the selected user's computer system and seeks to access an object service or target from the target instance by an access operation.

Query block 204 represents an inquiry as to whether the access operation meets the target access constraints (e.g. target access constraints 184) of the target being called on the target instance. Whenever the access operation does not meet the target access constraints of the target being called, query block 204 proceeds to process block 210. Whenever the access operation meets the target access constraints of the target being called, query block 204 proceeds to query block 212.

Process block 210 indicates that the access operation is denied.

Query block 212 represents an inquiry as to whether the target being accessed from the target instance has an access authorization of All. Whenever the target being accessed from the target instance has an access authorization of All, query block 212 proceeds to process block 214 as shown in FIG. 7B. Whenever the target being accessed from the target instance does not have an access authorization of All, query block 212 proceeds to query block 216.

Process block 214 indicates that the target being accessed by the accessing instance will provide a read operation (for a property) or an execute operation (for a method). In this implementation, object services with an access authorization of All are restricted from write and add operations by which an object from an unknown or untrusted source or owner could alter the target and therefore cause damage to or disclose confidential information on the selected user's computer system.

Query block 216 represents an inquiry as to whether the target has an access authorization of Owner. Whenever the target has an access authorization of Owner, query block 216 proceeds to query block 218. Whenever the target does not have an access authorization of Owner, query block 146 proceeds to query block 220.

Query block 218 represents an inquiry as to whether the accessing object has the same owner as the target instance. Whenever the accessing object has the same owner as the target instance, query block 218 proceeds to process block 222. Whenever the accessing object does not have the same owner as the target instance, query block 218 proceeds to process block 224.

Process block 222 indicates that the target will provide a read or write operation (for a property), an add operation for a collection property, or an execute operation (for a method). In this implementation, targets with an access authorization of Owner are available for all operations by an accessing object with the same owner as the target instance. This allows owners to access the properties of their objects unless the objects have exemplar access authorization. In addition, targets with an access authorization of Owner allow exemplars to execute methods or add to collection properties defined by other exemplars in the hierarchy of the accessing object. This access to execute and add operations for exemplars of different owners reflects the hierarchical inheritance relationships between objects in this implementation. As described below in greater detail, hierarchical inheritance allows object services to be dynamically inherited from exemplars.

Process block 224 indicates that the access operation is denied.

Query block 220 represents an inquiry as to whether accessing object is an exemplar of the target instance. This inquiry is based on the implementation in which target access authorizations are All, Owner, or Exemplar. Previous process steps have applied target access authorizations of All and Owner, thereby implying that the remaining authorization is Exemplar. As a result, query block 220 determines whether the condition for the Exemplar authorization is met. Whenever accessing object is an exemplar of the target instance, query block 220 proceeds to process block 226. Whenever the accessing object is not an exemplar of the target instance, query block 220 proceeds to process block 228. Process block 226 indicates that the target will provide a Read or Write operation (for a Property), an Add operation for a collection property, or an Execute operation (for a method) if the target instance is an instance of the accessing object exemplar. In this implementation, targets with an access authorization of Exemplar are available for all operations by an accessing object that is an exemplar of the target instance. This provides is a highly restrictive and secure condition for accessing the target.

Process block 228 indicates that the access operation is denied.

The security mechanism or process included in object creation process 180 includes several security features. One security feature is the owner identifier incorporated into objects. The owner identifier includes identification of the user, person, or entity (e.g., corporation) who or that creates the object, or identification of a computer system used by the user, person, or entity to create the object definition. The owner identifier provides a basis for distinguishing the creator of an object from the user of that object. This distinction allows instances of objects created by others to be given fewer access permissions or rights than the user implementing the object.

Another security feature is the set of access authorizations that allow different access rights to be made available to different object creators. In this implementation the target access authorizations are All, Owner, and Exemplar. It will be appreciated that more, fewer, or other target access authorizations could be utilized according to the access distinctions desired. For example, the object definition illustration of FIG. 5 does not include the inheritance relationships or the exemplars of the object definition illustration of FIG. 6. For the illustration of FIG. 5, therefore, the target access authorizations All and Owner could provide a level of security without the Exemplar authorization.

These security features are useful both alone and within the context of an object creation and instantiation process such as process 180. The security features provide various security levels by which objects from trusted and secure sources can have extensive access to a user's computer system resources while objects from unknown or untrusted sources have only limited, relatively safe access rights. Such versatility allows a user to utilize safely objects from a wide variety of sources.

These security mechanisms and methods are applicable to objects operating within a single computer system as illustrated with reference to computer system 152 or in a client-server context in which objects and object components are transmitted between a client computer and a separate server computer. For example, a client might not have all objects in a hierarchical relationship and might need objects or access to targets residing on the server. Another security feature applicable to such a context is the treatment of unverified client communications to the server as being from an unknown or untrusted source.

The information or attributes in the call stack relating to interactions between objects on a server and a client should be made available only according to access authorizations for the user of the client computer. The difficulty with client-server interactions in general, and particularly with remote clients and servers, is the risk of impersonation of one user client impersonating another in communications with the server.

Figure 10:
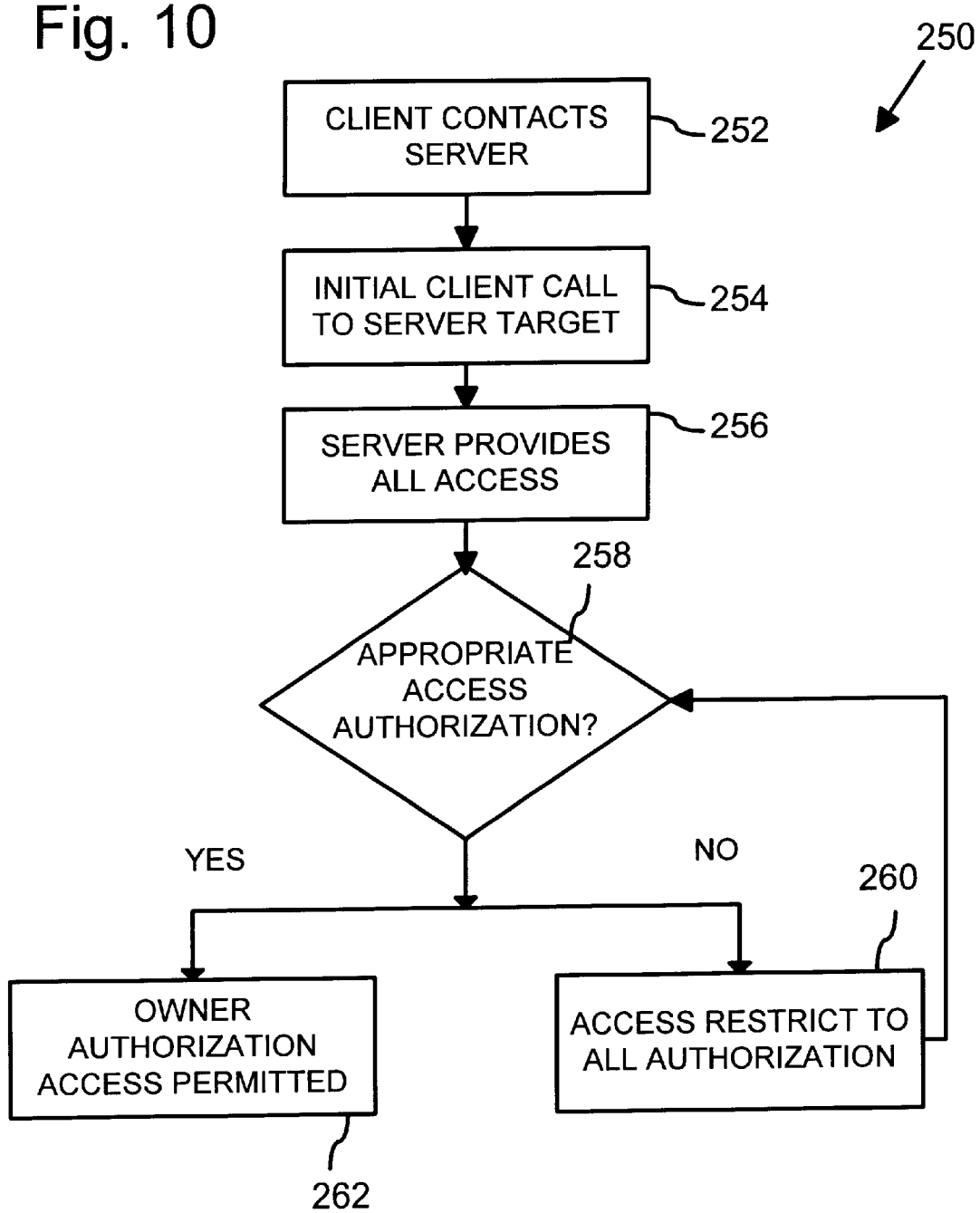
FIG. 10 is a flow diagram representing a client-server security process to maintain security in object interactions between a client and a server.

FIG. 10 is a flow diagram representing a client-server security process 250 to maintain security in object interactions between a client and a server. In this implementation, the server is treated as being a known, secure system and the client is treated as a potential security risk.

Process block 252 indicates that a client computer initiates communication with a remote server over a communication socket.

Process block 254 indicates that an accessing object on the client computer makes an initial call to a target of a target instance on the server.

Process block 256 indicates that server restricts the user (and the client computer) to targets having access authorizations of All. This restriction allows the client computer to access unrestricted targets, but prevents the client computer from accessing restricted targets having access authorizations of Owner and Exemplar, for example.

Query block 258 represents an inquiry from the server to the client computer as to whether the user on the client computer has appropriate access authorization (e.g., Owner). This inquiry is performed with object interactions utilizing unrestricted access authorizations (i.e., All) to validate the access authorizations of the user as conveyed from the client computer. Whenever the server cannot validate that the user has Owner access authorization, query block 258 proceeds to process block 260. Whenever the server can validate that the user has Owner access authorization, query block 258 proceeds to process block 262.

Process block 260 indicates that the server restricts the user (and the client computer) to targets having access authorizations of All. Process block 260 returns to query block 258.

Process block 262 indicates that accessing objects from the user (and the client computer) are permitted to access targets on the server having Owner access authorization and in which the user is the owner. This access is permitted though the targets on a call stack on the server. For each renewed access from the client, however, security process 250 returns to process block 252.

A benefit of security process 250 is that a breach of security on a client computer poses a risk only to targets for which the user of that client has owner access authorizations. For example, a client computer that does not establish user permissions before accessing the server can access on the server only targets available to the user. At most the security compromise would be with respect to objects owned by the user. This maintains the security of objects, methods, and properties that are on the server and owned by other users.

With regard to the inheritance relationships referenced in FIG. 6. Typically, properties and methods are associated with interfaces during a design time phase when a developer creates them. The interfaces defined under the component object model, for example, cannot be modified after the interfaces have been established, distributed, or promulgated. New functionality or other modifications typically are applied by adding a new interface at a design time phase. Interfaces are fixed or static during a run-time phase when the interfaces are used by or executed on behalf of a user.

FIG. 11 is a flow diagram illustrating a dynamic inheritance process 300 as a run-time use of objects. For purposes of illustration, dynamic inheritance process 300 is described with reference to the sequence of hierarchical inheritance relationships shown in FIG. 4.

Process block 302 indicates that a reference or call is made to a selected service (e.g., a property or a method) at a selected object (e.g., object 82), thereby making the selected object the current object. The reference or call may be made in the conventional manner that properties and methods of an object are referred to or called.

Query block 304 represents a query as to whether the current object receiving the reference or call (e.g., object 82) supports the selected property or method. Whenever the current object (e.g., object 82) supports the selected property or method, query block proceeds to process block 106. Otherwise, query block 304 proceeds to process block 310.

Process block 306 indicates that the selected property or method is provided by the current object. Process block 306 proceeds to termination block 308.

Process block 310 indicates that the reference or call to the selected property or method is passed to the direct exemplar of the current object and the direct exemplar is redesignated the current object. Process block 310 returns to query block 304.

Process 300 provides a mechanism for dispatching properties and methods to exemplars. Process 300 supports dynamic inheritance of other properties and methods at run-time by allowing intervening exemplars to be added to a hierarchy of objects.

In one implementation I-Thing interface 80 also defines, supports, or implements methods 80*b* that include the dynamic inheritance methods set forth in Table 4. Methods 80b in Table 1 are available to each object of which I-Thing object 80 is the root exemplar (e.g. objects 72–78 and 82).

TABLE 4

| Name | Action |
| --- | --- |
| AddMethod | Adds a designated method to make the method available to the object |
| RemoveMethod | Removes a designated method to make the method unavailable to the object |
| Addproperty | Adds a designated property to make the property available from the object |
| RemoveProperty | Removes a designated property to make the property unavailable from the object |
| GetMethod | Returns a designated method including the number and types of the method parameters |
| GetProperty | Returns a designated method including the number and types of the property parameters |
| PutMethod | Puts a designated value or designated values in the parameters of a designated method |
| PutProperty | Puts a designated value or designated values in the parameters of a designated property |
| InvokeMethod | Invokes a designated method |

For example, methods and properties available for implementation or access by the dynamic inheritance methods of I-Thing interface 80 are in a dynamic inheritance listing, such as a table, that indicates the names of the methods and properties, defines the services they provide, and includes unique identifiers for them. The unique identifiers may be of the form of integer values like the dispatch identifiers (DISPIDs) used with the dispatch interface of the IDispatch interface used in COM automation.

The AddMethod and the AddProperty methods allow methods and properties, respectively, to be added to the dynamic inheritance listing so that the listing may be modified during run-time. These methods pass the name and a definition of the method or property to be added to the dynamic inheritance table and assign a corresponding unique identifier for the method or property. The RemoveMethod and the RemoveProperty methods remove methods and properties from the dynamic inheritance listing. The InvokeMethod method allows a user to execute the designated method.

The GetMethod and the GetProperty methods return a designated method and property, respectively, from the dynamic inheritance listing. The PutMethod and the PutProperty methods allow a user to set the method or property.

The dynamic inheritance methods of Table 1, as well as the dynamic inheritance process 300 of FIG. 10, allow methods and properties to be dynamically added to or changed within otherwise conventional static interfaces. The adding of the methods and properties includes accessing information about the methods and properties, setting values in and retrieving values from them, and invoking the methods. Methods and properties may be added in effect by accessing them from an exemplar to a particular object according to dynamic inheritance process 100. In addition, methods and properties may be added by adding them to the set of methods and properties available at an exemplar, such as the root exemplar Thing.

These security features allow inheritance to be dynamic and provide a seamless scripting environment in programmable applications like virtual world environments. Moreover, the dynamic inheritance methods of Table 1 and dynamic inheritance process 300 of FIG. 10 may be used together as described hereinabove, or either may be used alone to provide dynamic inheritance functionality.

The dynamic inheritance method InvokeMethod is similar to the Invoke method of the IDispatch interface used in COM automation. The IDispatch::lnvoke method allows a software client to invoke a designated software method available from another application. The methods available from the other application are specified in a dispatch interface (often called a dispinterface). Dispatch identifiers (DISPIDs) identify the available methods. The similarity between the dynamic inheritance of this invention and the IDispatch interface used in COM automation extends no farther.

The dynamic inheritance of this invention allows methods and properties to be added to or removed from the set of available methods and properties. In contrast, IDispatch interface used in COM automation is a conventional COM interface and is immutable once it has been established. Methods and properties are not added to an IDispatch interface after it has been established. It will be appreciated, therefore, that changing the methods and properties available to an interface like the I-Thing interface 80 after it has been established is a major improvement upon the prior functionality of objects with fixed interfaces (e.g., COM objects) like the IDispatch interface.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. In a computer-readable medium having stored thereon a first software object that is defined by a person or entity to receive a call from a second software object, the call being to an operation on a service that includes a method or property, the improvement comprising:

an access authorization security condition associated with the service and conditioning access to the service by the second object on whether the second object is in one of plural object security classes, one of which being a security class in which the first and second objects are defined by the same person or entity, wherein the first object is one of plural objects that have between them hierarchical relationships by which services are inherited between the objects, another of the plural object security classes relating to whether the call from the second object has a hierarchical relationship with the first object.

2. The computer-readable medium of claim 1 further comprising an owner identifier associated with each of the first and second objects and identifying the person or entity that defined each of the objects.

3. The computer-readable medium of claim 1 in which another of the plural object security classes is unrestricted as to the person or entity that defined each of the objects but provides access only to limited operations available from the service.

4. The computer-readable medium of claim 3 in which the limited operations include only read and execute operations.

5. The computer-readable medium of claim 3 in which the limited operations do not include write operations.

6. The computer-readable medium of claim 1 in which the object security class relating to whether the call from the second object has a hierarchical relationship with the first object is based upon it and the call from the second object originating from a common object in the hierarchical relationship.

7. The computer-readable medium of claim 1 in which the object security class relating to whether the call from the second object has a hierarchical relationship with the first object is based upon the call from the second object and the operation on the service originating in objects in the hierarchical relationship of the first object.

8. The computer-readable medium of claim 1 in which the first and second objects represent entities in a virtual world environment.

9. The computer-readable medium of claim 1 in which the person or entity defining an object is its owner and the security class in which the first and second objects are defined by the same owner allows owners to access properties of objects they own.

10. The computer-readable medium of claim 1 in which the first object is one of plural objects that have between them hierarchical relationships by which services are inherited from exemplar objects, an exemplar one of the plural object security classes relating to whether the call from the second object has a hierarchical relationship with the first object, the exemplar security class allowing a method of the first object defined by one exemplar to execute methods defined by another exemplar in the hierarchical relationship of the first object.

11. The computer-readable medium of claim 1 in which the first object is one of plural objects that have between them hierarchical relationships by which services are inherited from exemplar objects, an exemplar one of the plural object security classes relating to whether the call from the second object has a hierarchical relationship with the first object, the exemplar security class allowing a method of the first object defined by one exemplar to add to a collection property defined by another exemplar in the hierarchical relationship of the first object.

12. A computer-readable medium having stored thereon software instructions by which a first software object accesses a service from a second software object, the service including access to a method or a property, comprising:

software instructions for obtaining an owner identifier associated with each of the first and second objects, each owner identifier identifying the person or entity that defined each of the objects;

software instructions for determining whether the first object is in one of plural object security classes, one of which being an owner security class in which the first and second objects have a common owner identifier; and software instructions for conditioning access to the service by the first object on whether it is in the owner security class, wherein the second object is one of plural objects that have between them hierarchical relationships by which services are inherited between the objects, another of the plural object security classes relating to whether the call from the first object has a hierarchical relationship with the second object.

13. The computer-readable medium of claim 12 in which another of the plural object security classes is unrestricted as to the owner identifier but provides access only to limited operations available from the service.

14. The computer-readable medium of claim 13 in which the limited operations include only read and execute operations.

15. The computer-readable medium of claim 13 in which the limited operations do not include write operations.

16. The computer-readable medium of claim 12 in which the object security class relating to whether the call from the second object has a hierarchical relationship with the first object is based upon the call from the second object and the operation on the service originating in objects in the hierarchical relationship of the first object.

17. The computer-readable medium of claim 12 in which the object security class relating to whether the call from the first object has a hierarchical relationship with the second object is based upon it and the call from the second object originating from a common object in the hierarchical relationship.

18. In a computer-readable medium having stored thereon a first software object having at least one object for receiving a call from a second software object, the call being to an operation on a service that includes a method or property, the improvement comprising:

a hierarchical relationship between the first object and at least one other object by which relationship services are inherited between the objects; and an access authorization security condition associated with the service and conditioning access to the service by the second object on whether the second object is in one of plural object security classes, one of which being a security class in which the first and second objects have a hierarchical relationship between them and another of the plural object security classes is a security class in which the first and second objects are defined by the same person or entity.

19. The computer-readable medium of claim 18 in which the object security class relating to whether the call from the second object has a hierarchical relationship with the first object is based upon it and the call from the second object originating from a common object in the hierarchical relationship.

20. The computer-readable medium of claim 18 further comprising an owner identifier associated with each of the first and second objects and identifying the person or entity that defined each of the objects.

21. The computer-readable medium of claim 18 in which another of the plural object security classes is unrestricted as to the person or entity that defined each of the objects but provides access only to limited operations available from the service.

22. The computer-readable medium of claim 21 in which the limited operations include only read and execute operations.

23. The computer-readable medium of claim 21 in which the limited operations do not include write operations.

24. A computer-readable medium having stored thereon software instructions by which a first software object accesses a service from a second software object, the service including access to a method or a property, comprising:

software instructions for identifying a hierarchical relationship between the first and second objects;

software instructions for determining whether the first object is in one of plural object security classes, one of which being a security class in which the first and second objects have a hierarchical relationship between them and another of which is a security class in which the first and the second objects are defined by the same person or entity; and software instructions for conditioning access to the service by the first object on whether it is in the owner security class.

25. The computer-readable medium of claim 24 in which another of the plural object security classes is unrestricted as to whether the first and second objects are defined by the same person or entity but provides access only to limited operations available from the service.

26. The computer-readable medium of claim 23 in which the limited operations include only read and execute operations.

27. The computer-readable medium of claim 25 in which the limited operations do not include write operations.

28. In a computer-readable medium having stored thereon a first software object that is defined by a person or entity to receive a call from a second software object, the call being to an operation on a service that includes a method or property, the improvement comprising:

an access authorization security condition associated with the service and conditioning access to the service by the second object on whether the second object is in one of plural object security classes, one of which being a security class in which the first and second objects are defined by the same person or entity, wherein the person or entity defining an object is its owner and the security class in which the first and second objects are defined by the same owner allows owners to access properties of objects they own.

29. A computer-implemented process by which a first software object accesses a service from a second software object, the service including access to a method or a property, the process comprising the steps of:

obtaining an owner identifier associated with each of the first and second objects, each owner identifier identifying the person or entity that defined each of the objects;

determining whether the first object is in one of plural object security classes, one of which being an owner security class in which the first and second objects have a common owner identifier; and conditioning access to the service by the first object on whether it is in the owner security class, wherein the second object is one of plural objects that have between them hierarchical relationships by which services are inherited between the objects, another of the plural object security classes relating to whether the call from the first object has a hierarchical relationship with the second object.

30. A computer-implemented process by which a first software object accesses a service from a second software object, the service including access to a method or a property, the process comprising the steps of:

identifying a hierarchical relationship between the first and second objects;

determining whether the first object is in one of plural object security classes, one of which being a security class in which the first and second objects have a hierarchical relationship between them and another of which is a security class in which the first and the second objects are defined by the same person or entity; and conditioning access to the service by the first object on whether it is an owner security class.

* * * * *